United States Patent [19]

Tolliver

[11] 4,209,179
[45] Jun. 24, 1980

[54] PIPE JOINT SEAL

[76] Inventor: Wilbur E. Tolliver, 364 Hamilton Dr., Holland, Mich. 49423

[21] Appl. No.: 40,273

[22] Filed: May 17, 1979

[51] Int. Cl.² .................... F16J 15/32; F16J 15/40
[52] U.S. Cl. .................... 277/205; 277/27; 277/207 A; 285/110; 285/232; 285/345
[58] Field of Search ............... 285/110, 230, 232, 235, 285/332.3, 345, 369; 277/152, 153, 165, 205, 207 R, 207 A, 212 R, 212 F, 27

[56] References Cited

U.S. PATENT DOCUMENTS

| 2,259,453 | 10/1941 | Beyer et al. ............... 285/232 X |
| 3,315,970 | 4/1967 | Holloway ...................... 277/205 |
| 3,491,825 | 1/1970 | Peterson et al. ............ 277/34.3 X |
| 3,787,061 | 1/1974 | Yoakum ..................... 285/110 X |

FOREIGN PATENT DOCUMENTS

| 225666 | 11/1959 | Australia ..................... 285/110 |
| 1068068 | 10/1959 | Fed. Rep. of Germany ...... 285/110 |
| 2350265 | 5/1974 | Fed. Rep. of Germany ...... 285/369 |
| 2414727 | 10/1975 | Fed. Rep. of Germany ........ 277/27 |
| 537484 | 6/1941 | United Kingdom ............ 285/345 |
| 1283164 | 7/1972 | United Kingdom ......... 277/207 A |

*Primary Examiner*—Robert S. Ward, Jr.
*Attorney, Agent, or Firm*—Price, Heneveld, Huizenga & Cooper

[57] ABSTRACT

The specification discloses a pressure responsive pipe joint seal for sealing connecting pipe joint members. The sealing flanges on the seal define upwardly, outwardly and downwardly curved upper surfaces so that there is less tendency for them to get caught on a pipe joint member as adjacent members are slid into coupling relationship. The seal includes an inflatable bladder whereby the seal can be inflated after it is in its operative position. In one embodiment disclosed, the seal includes a cavity containing a lubricant, the cavity being covered with a rupturable membrane such that when pipe joint members are joined together, the membrane ruptures releasing the lubricant.

7 Claims, 8 Drawing Figures

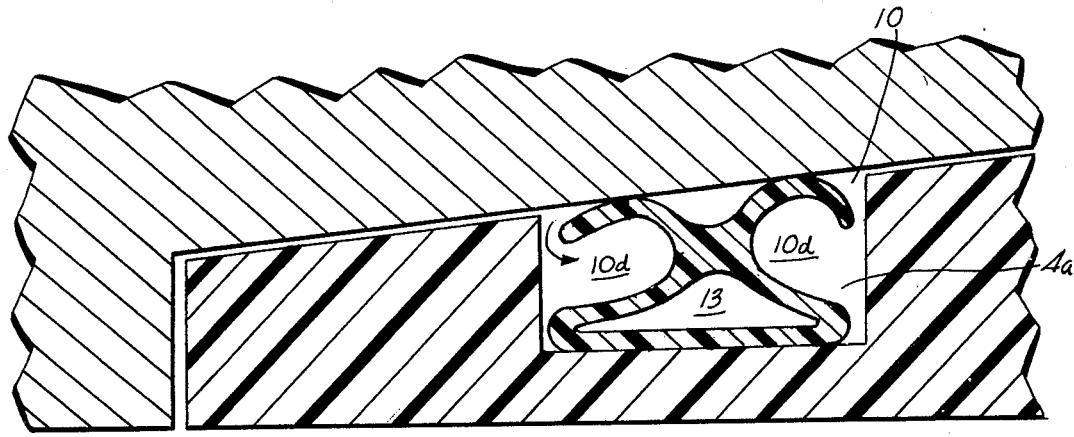
Fig. 5.
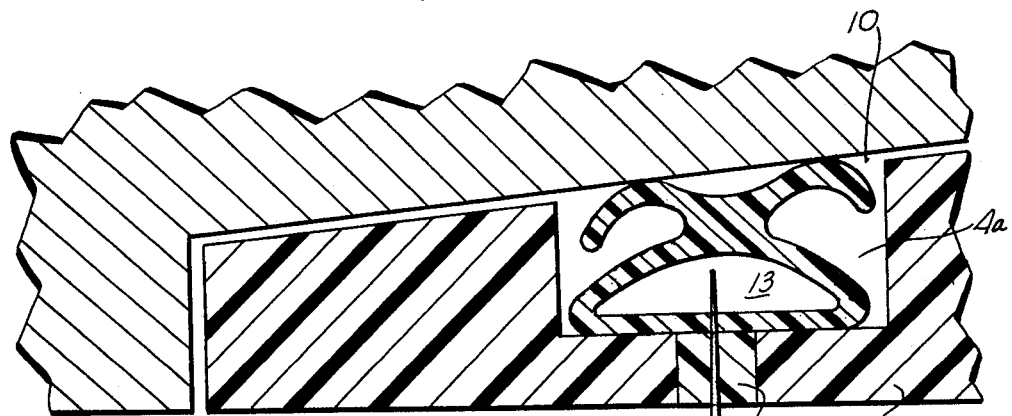
Fig. 6.
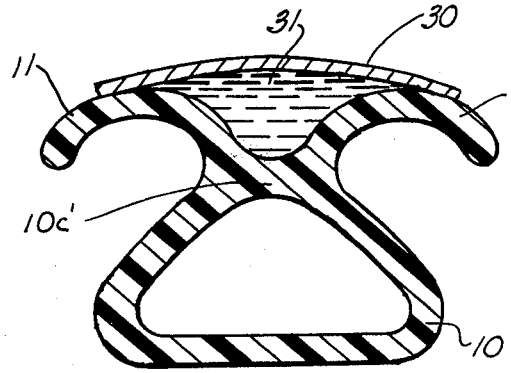
Fig. 7.
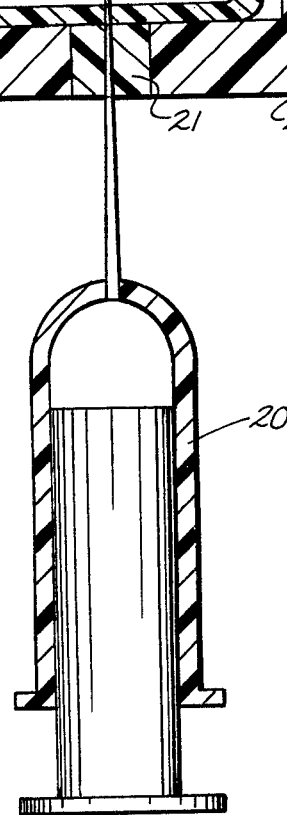

PIPE JOINT SEAL

BACKGROUND OF THE INVENTION

In joining pipe sections so that fluids contained in the pipe will be sealed therein, various sealing joints have been utilized. The most common sealing joint comprises an "O" ring which is secured over the male projecting end of a pipe which is subsequently inserted into a corresponding female end of an adjoining pipe or coupler. In a similar structure, a separate male coupler has "O" rings inserted over each of its ends and is inserted between two female ends of adjoining pipes.

One problem encountered at pipe joints is the leakage of water or fluid either outwardly from the inside of the pipe to the outside thereof or inwardly from the outside of the pipe to the inside thereof. In water lines, the water inside the pipe is usually under pressure and there is a tendency for such water to leak through the joints to the exterior of the pipe. In sewer and drain lines, there is a tendency for ground water to build up around the pipe and leak inwardly into the sewer system. This type of leakage is undesirable in that it floods the sewer with drain water and hampers the sewer in performing its intended function.

Sealing members have been devised which respond to increases in internal or external pressure to effect a tighter seal. One type of seal comprises basically an "O" ring which includes an inner, annular slot therein so that fluid in a water pipe tends to flow into the interior of the seal and expand it outwardly. Another type of seal includes protruding flanges which are forced outwardly against the surfaces they abut in response to increases in internal or external pressure. Unfortunately, such flanges tend to get hung-up on one pipe joint member as it is being slid onto another pipe joint member, thereby causing the entire seal to be moved out of its proper place. This fouls the sealability of the entire joint.

To help prevent seals from dragging on a pipe joint member as it is slipped over another pipe joint member, workmen typically lubricate the seal with some type of grease. While this is helpful, it is a messy and time-consuming operation which unduly adds to the cost of constructing a pipe line.

SUMMARY OF THE INVENTION

In the present invention, a pipe joint seal is provided which includes a base and at least one projecting sealing flange which curves upwardly, outwardly and then downwardly from the base to define a curved upper surface over which a pipe joint surface can slide during the coupling of adjacent pipe joint members. In this way, there is much less tendency for the flange to be caught by a pipe joint member during coupling and there is accordingly much less tendency for the seal to become fouled. Preferably, the seal is used in conjunction with a coupling collar having a channel therein for receiving the seal. The sealing flange extends downwardly from its uppermost point to a point at which its exposed edge is below the level of the channel, thereby further minimizing the chances of the seal being caught and fouled.

In another aspect of the invention, the seal includes an inflatable bladder so that the seal can be inflated after it is in its operative position between two pipe joint members. This provides further insurance against leaking as a result of either internal or external pressure.

Finally, in yet another aspect of the invention the seal includes a cavity for containing a lubricant and means associated with the cavity for releasing the lubricant as one pipe joint member is slid over the seal and the pipe joint member in which the seal is contained. In this way, the costly hand greasing operation which pipe line contractors must now utilize is eliminated.

These and other aspects, features, objects and advantages of the invention will be more fully understood and appreciated by reference to the written specification and appended drawings.

BRIEF DESCRIPTION OF THE DRAWINGS

FIG. 5 is the sealably mounted pipe joint of FIG. 4 with the seal deformed by fluid pressure from outside the pipe;

FIG. 6 shows a slightly modified seal in that a rubber plug has been added to facilitate inflation as illustrated;

FIG. 7 is an enlarged cross-sectional view of a seal comprising a lubricant-containing cavity covered by a rupturable membrane.

DESCRIPTION OF THE PREFERRED EMBODIMENT

Figure 1:
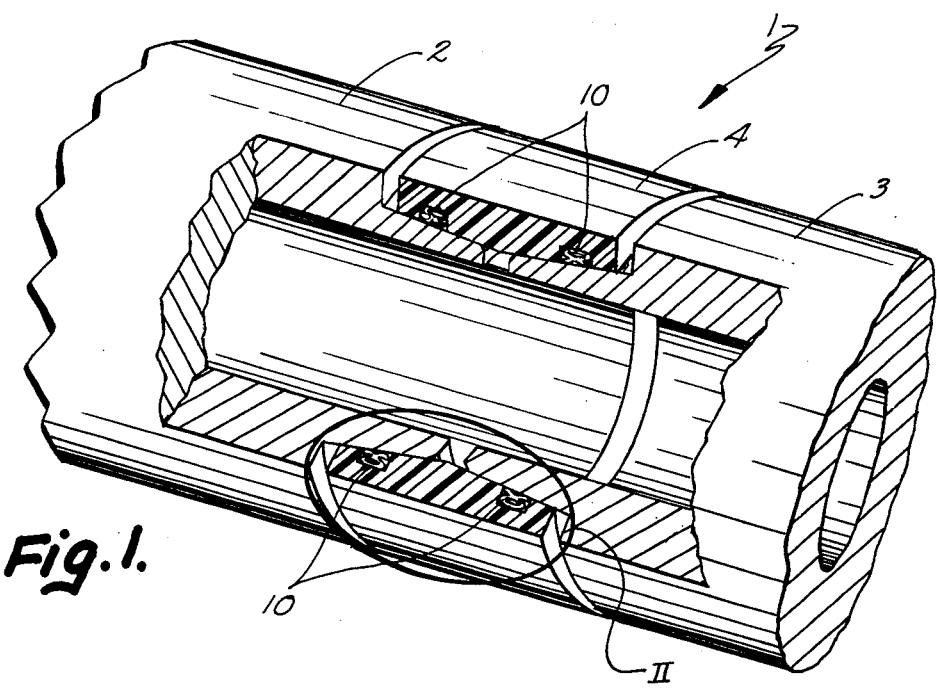
FIG. 1 is a fragmentary, perspective view of a pipeline joint with portions thereof cut away.
Figure 8:
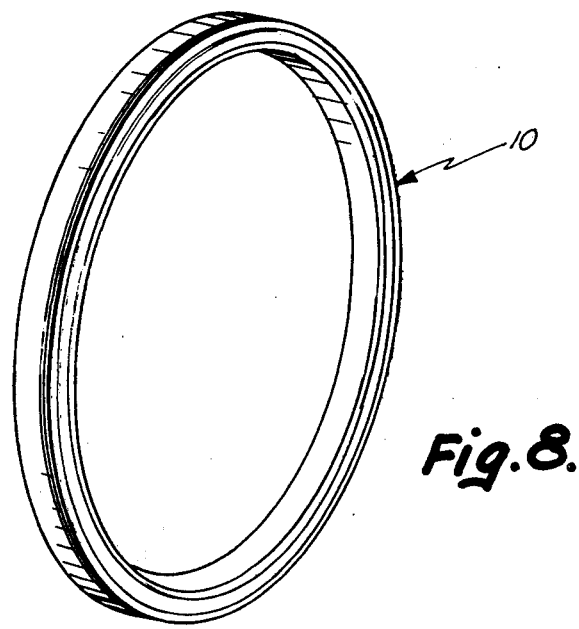
FIG. 8 is a perspective view of the pipe joint seal.

Referring to the drawings and in particular to FIG. 1, a pipe joint 1 is formed by joining two male ended pipe sections 2 and 3 by means of female coupler 4 which slidably receives the protruding ends of the pipe sections 2 and 3. Since pipe sections 2 and 3 and coupler collar 4 all form the joint 1, they are each considered hereinafter to be a pipe joint member, it being understood that other pipe joints might utilize other combinations of pipe joint members. Two annular seals 10, which extend circumferentially along the interior of coupler 4 in channels 4a thereof (FIG. 2) act to seal the pipe joint 1 so that external fluids may not leak into the pipeline nor can internal fluids leak out from the pipeline.

Figure 2:
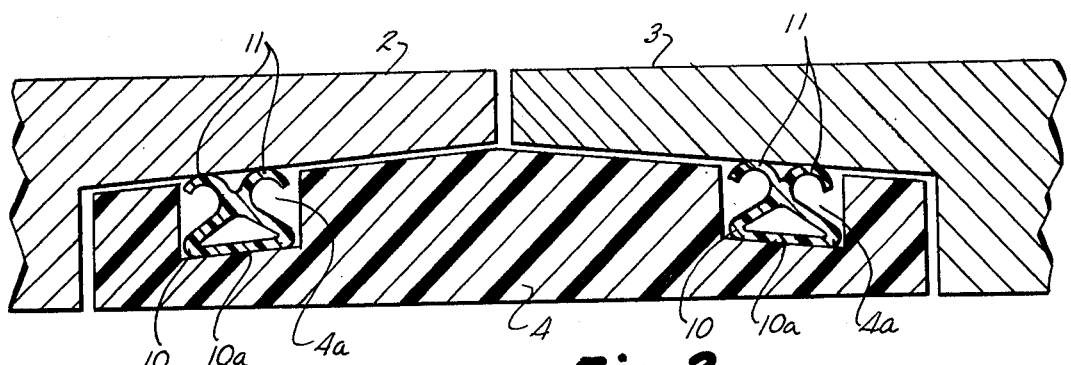
FIG. 2 is an enlarged view of the encircled area II of FIG. 1.
Figure 3:
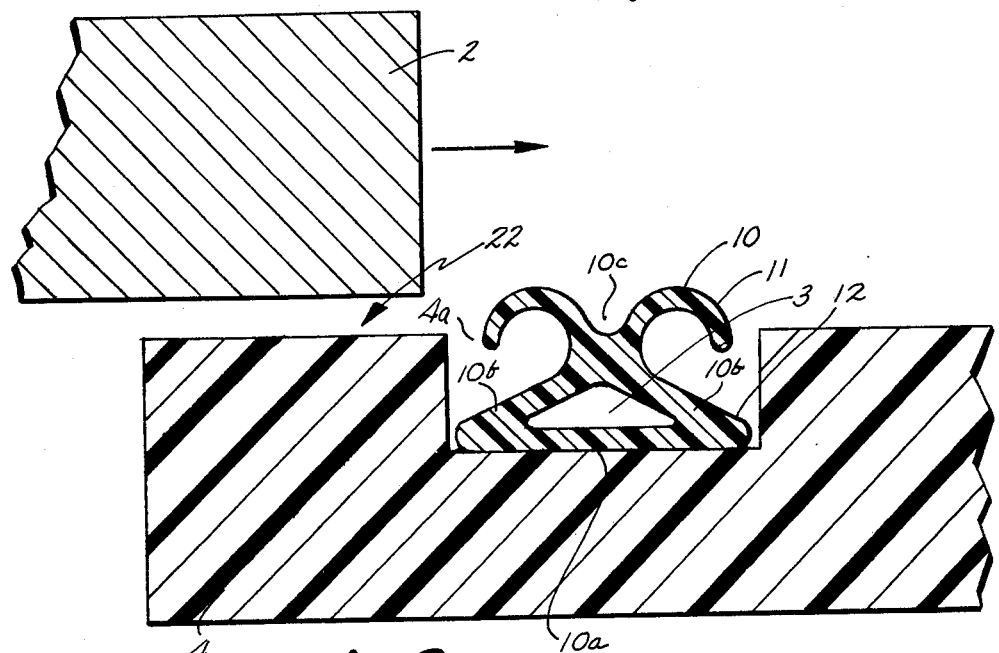
FIG. 3 is an enlarged partial view of the coupler seal and pipe of FIG. 2 as the coupler and pipe are being joined.

Referring to FIG. 2, seal 10 which is preferably comprised of a flexible, resilient material, is generally triangular in cross sectional shape with flared sealing flanges 11 and with a flat seating base 10a which rests against coupler 4 along the bottom of channel 4a. As seen in FIG. 3, seal 10 comprises a hollow central area 13 which is formed by base 10a and the upwardly directed side walls 10b. Curved sealing flanges 11 extend outwardly from apex 10c formed by side walls 10b.

Figure 4:
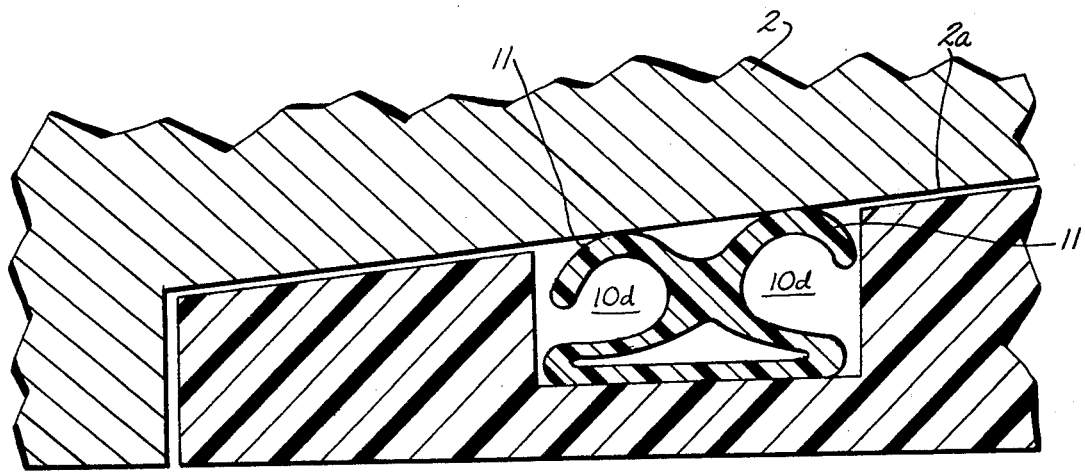
FIG. 4 is a view of the coupler seal and pipe of FIG. 3 after the pipe has been sealably mounted on the coupler.

As seen in FIG. 3, as pipe section 2 is slidably joined with coupler 4, the outwardly curved sealing flanges 11 engage pipe 2 along its inside surface 2a. As seen in FIG. 4, seal 10 is generally compressively deformed when the coupler 4 and the pipe 2 are in the joint-forming configuration. By such deformation, base 10a of the seal 10 is closely pressed against the bottom of channel 4a so as to prevent passage of fluids along channel 4a. Also, flanges 11 are compressed and slightly flattened against surface 2a of the pipe 2 so as to prevent passage of fluids along surface 2a and thus seal the pipe joint 1.

As can be seen in FIG. 5, the generally circular-shaped area 10d enclosed and formed between the upwardly extending seal walls 10b and flanges 11 acts to distribute the fluid pressure (shown by the arrow) against walls 10b and flanges 11. Because the pressure-exposed surface area of the seal is greatest around 10d, the fluid pressure outwardly directs the flanges 11 forming a tighter seal against the inside surface of pipe 2. Further, the fluid pressure downwardly directs side walls 10b which act to push base wall 10a securely into the bottom of channel 4a forming a tighter seal there.

The pressure response of the flange 11 and side wall 10b on one side of the generally symmetrical seal does not prevent a similar response from the other side to fluids seeking entry into the joint 1 from that side. It is of particular importance to note, that the greater the forces exerted by fluid pressure seeking to move into joint 1, the stronger the seal formed by flange 11 against surface 2a of the pipe will be. Similarly, the stronger the seal formed by base 10a against the bottom of the channel 4a of the coupler will be.

As shown in FIG. 6, the hollow area 13 housed in the interior of seal 10 and formed therein by base 10a and side walls 10b serves as an inflatable bladder. Preferably as shown, the seal is comprised from an inflatable expandable material so that the hollow area 13 will hold the inflating substance when inflated. If desired, a separate bladder or a bladder membrane may be incorporated into the seal 10 to facilitate inflation of it.

The coupler 4 comprises a needle valve 21 through which a hypodermic syringe 20 may be inserted to inflate hollow area or bladder 13. The needle valve 21 is a small rubber plug secured in the coupler 4 to extend radially inward so as to generally coincide with the center of channel 4a. The needle valve 21 may be comprised of any suitable needle valve material and as shown is similar to the assembly utilized to fill playing balls with inflatable bladders, e.g., footballs or basketballs.

As bladder 13 is filled with compressed air or another inflating material, flanges 11 are pressed into surface 2a and base 10a is pressed into the bottom of channel 4a without the additional need of fluid pressure on elements 11 and 10b. The combined sealing effect of expanding the seal by inflating the bladder and the pressure response of the flanges and side walls of the seal act to form an exceedingly leak-and-contamination resistant joint. It should be noted, that bladder 13 may not only be inflated with fluids, e.g., air, but also may be inflated with various flowable materials.

In another embodiment of this invention, shown in FIG. 7, the seal 10 comprises a reservoir 31 containing a lubricant. The reservoir 31 is formed by a membrane 30 attached to the seal 10 between the flaps 11 to form a lubricant-containing cavity directly above the apex 10c of the seal 10. The membrane 30 extends circumferentially around the seal 10 and contains lubricant in cavity 31 throughout the circumference. Membrane 30 is adhered to the tops of flanges 11 by adhesive or by heat sealing. As shown membrane 30 is rupturable and serves as a means for releasing the lubricant. The membrane 30 may be comprised of any suitable material which will be torn from the flanges 11 or itself be ruptured by contact with the edge or inside surface of an adjoining pipe section.

When utilizing the seal of FIG. 7 in a pipe joint such as that shown in FIG. 1 above, seal 10 is placed in the coupler 4 as shown in FIG. 3. As the pipe 2 and the coupler 4 are joined, the inside surface 2a of pipe 2 contacts the membrane 30 and either tears the membrane to release lubricant or disengages the membrane 30 from flange 11 to release the lubricant.

It will be apparent to one skilled in the art, that the lubricant-containing reservoir could be a spongelike or porous material rather than a cavity as shown. Also, other suitable means to release the lubricant from the cavity could be utilized in this seal.

As is readily apparent by the above description, the pressure-responsive seal described above may be utilized with various type joint structures, for example, pipes 2 and 3 could comprise female members on their in sections which are inserted onto a male-type coupler. Such a structure would comprise two seals in a manner similar to the embodiment shown in FIG. 1 with the seals mounted in channels in either the pipe sections or the coupler. Also, pipe sections which comprise joints consisting of single seals would also be suitable with the pressure-responsive seal of this invention. Other joints, utilizing the seal of this invention would be readily apparent to those skilled in the art.

It will be understood that various changes in the details, materials, steps and arrangements of parts which have been herein described and illustrated in order to explain the nature of the invention, may be made by those skilled in the art within the principle and the scope of the invention as expressed in the appended claims.

The embodiments of the invention in which an exclusive property or privilege is claimed are defined as follows:

1. A pressure responsive pipe joint seal for sealing connecting pipe sections comprising: an annular base member for fitting into a receiving channel in a joint member and at least one annular and resiliently flexible sealing flange on said base member curving upwardly, outwardly and then downwardly from said base member, said sealing flange and base member acting to tighten against the pipe joint surfaces they abut when fluid pressure is exerted against the seal and said sealing flange defining a curved upper surface over which a pipe joint surface can slide during coupling of adjacent pipe joint members.

2. The pipe joint seal of claim 1 in combination with a pipe joint member having a recessed channel therein including a base wall and side walls, said base of said seal being positioned in said channel against said base wall thereof; said sealing flange extending downwardly a sufficient distance from its uppermost point that the exposed edge of said sealing flange is below the top of its adjacent channel side wall whereby said exposed edge cannot be caught by another pipe joint member being coupled to said joint member.

3. The pipe joint seal of claim 1 comprising at least two of said annular and resiliently flexible sealing flanges curving upwardly, outwardly and then downwardly from said base in opposite directions whereby one of said sealing flanges facilitates sealing against pressure exerted by incoming fluid and the other of said sealing flanges serves to facilitate sealing with respect to outgoing fluid under pressure.

4. The pipe joint seal of claim 3 wherein said base member is generally triangular in shape and said outwardly directed curved sealing flanges extending generally opposite from each other from an apex of said base member.

5. The pipe joint seal of claim 4 wherein said base member comprises a hollow, expandable bladder, said bladder when expanded acting to further tighten said sealing flanges and base member against the respective abutting pipe surfaces which they extend along in use.

6. The pipe joint seal of claim 3 in combination with a pipe joint member having a recessed channel therein including a base wall and sidewalls, said base of said seal being positioned in said channel against said base wall; each said sealing flange extending downwardly a sufficient distance from its uppermost point that the exposed edge of said flange is below the top of its adjacent channel sidewall where it cannot be caught by another joint member being coupled to said joint member.

7. The pipe joint of claim 3 in which said base member is hollow to increase its compressibility.

* * * * *